United States Patent Office 2,957,882
Patented Oct. 25, 1960

2,957,882

1-PICOLINOYL-2-BENZYLHYDRAZINE LOWER ALKYL HALIDES

Thomas Samuel Gardner, Rutherford, John Lee, Montclair, and Edward Wenis, Leonia, N.J., assignors to Hoffmann-La Roche Inc., Nutley, N.J., a corporation of New Jersey No Drawing. Filed Sept. 29, 1959, Ser. No. 843,043

3 Claims. (Cl. 260—295)

This invention relates to 1-picolinoyl-2-benzylhydrazine lower alkyl halides and preferably the methyl halides with particular preference for the methyl bromide and methyl iodide.

In our experiments, compounds of the type described could not be obtained as expected by quaternizing the tertiary amine with an alkyl halide. We have found, however, that a lower alkyl picolinate lower alkyl halide, such as ethyl- or methyl picolinate methyl bromide or iodide, will react with benzylhydrazine, preferably in an aqueous solvent at elevated temperature, to produce the results desired.

The 1-picolinoyl-2-benzylhydrazine lower alkyl halides are useful as antidepressants. They are amine oxidase inhibitors which stimulate the central nervous system and are particularly useful in psychotherapy for treatment of disturbed and depressed states. They may be administered orally or parenterally in the form of tablets, capsules or injectables produced by combining therapeutic dosages with the usual liquid or solid vehicles according to conventional pharmaceutical practice.

Example 1

A solution consisting of 86 g. of methyl picolinate in 500 g. of methanol was saturated with methyl bromide (170 g.) at Dry Ice-alcohol temperature and then heated on an autoclave under 500 lbs. nitrogen pressure at 80–100° C. The methanol was distilled off and the residue was crystallized from ethanol. The 1-methyl-2-carbomethoxypyridinium bromide was recrystallized twice from methanol, M.P. 173–174° C.

70 g. of 1-methyl-2-carbomethoxypyridinium bromide, 50 ml. of water and 43 g. of benzylhydrazine were boiled for 5 minutes, then evaporated to dryness under vacuum. The residue was taken up in 500 ml. of ethanol and re-evaporated. This residue was crystallized from 200 ml. of ethanol and recrystallized from ethanol an additional three times. The product, 1-picolinoyl-2-benzylhydrazine methyl bromide hydrate melted at 90–92° C.

*Analysis.*—Calculated for $C_{14}H_{16}BrN_3O \cdot H_2O$: C, 49.4; H, 5.3; N, 12.3; Br, 23.5. Found: C, 49.62, 49.61; H, 5.24, 5.24; N, 12.30, 12.31; Br, 24.16, 24.22.

Example 2

100 g. of ethyl picolinate were treated at reflux for 16 hours with 300 g. of methyl iodide in 500 ml. of methanol. On concentrating and standing for 2 weeks, the crystals which formed were filtered off and recrystallized from ethanol. The ethyl piconilate methiodide melted at 107–109° C.

27 g. of ethyl picolinate methiodide were reacted at 100° C. for 5 minutes with 16.5 g. of benzylhydrazine in 50 ml. of water. The solution was dehydrated by adding alcohol followed by distillation to dryness. The residue was crystallized from alcohol. The 1-picolinoyl-2-benzylhydrazine methiodide hemihydrate melted at 118–120° C.

*Analysis.*—Calculated for $C_{14}H_{16}IN_3O \cdot \frac{1}{2}H_2O$: C, 44.5; H, 4.5. Found: C, 44.9, 44.3; H, 5.3, 4.8.

We claim:
1. 1-picolinoyl-2-benzylhydrazine lower alkyl halide.
2. 1-picolinoyl-2-benzylhydrazine methyl bromide.
3. 1-picolinoyl-2-benzylhydrazine methyl iodide.

References Cited in the file of this patent

UNITED STATES PATENTS 2,923,714    Gardner et al. _____ Feb. 2, 1960

OTHER REFERENCES

Grammatickais: Bull. Soc. Chim. France, vol. 1955, pp. 1471–1479 (1955).

Segonne: Chemical Abstracts, vol. 51, pp. 13863–13864 (1957).